Figure 1:
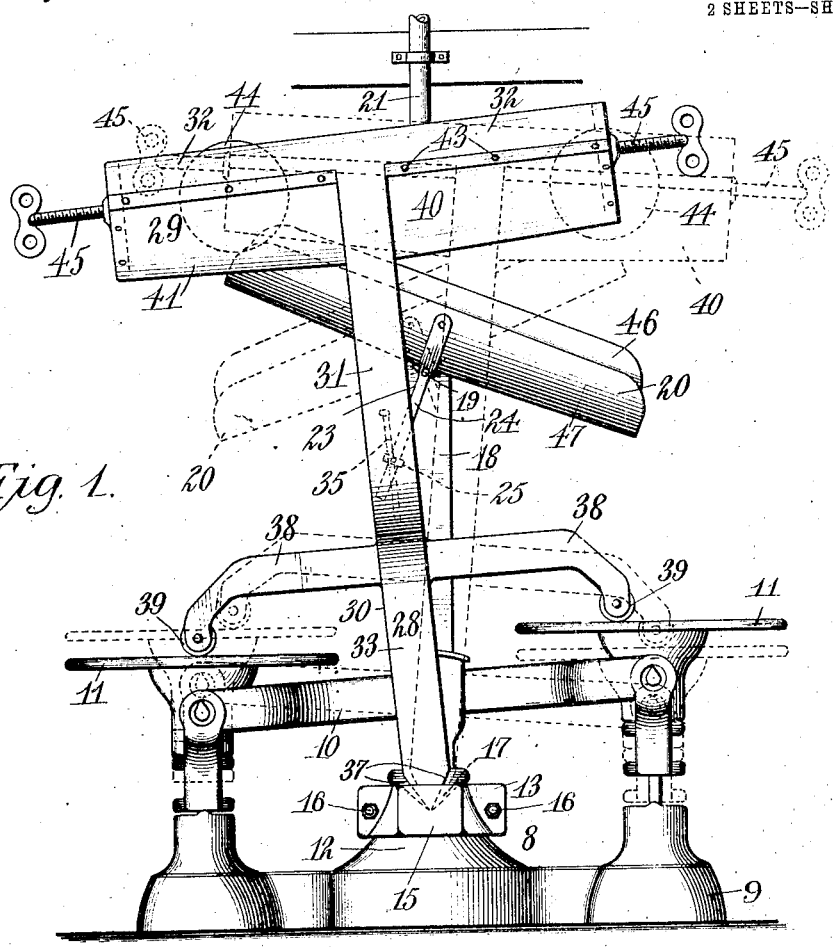

J. HEFTER.
AUTOMATIC WEIGHING MACHINE.
APPLICATION FILED MAR. 13, 1911.

1,019,323.

Patented Mar. 5, 1912.

2 SHEETS—SHEET 1.

Witnesses:
Jacob Oberst, Jr.
Ella E. Puckhahn

Joseph Hefter, Inventor.
By Emil Neuhart
Attorney.

J. HEFTER.
AUTOMATIC WEIGHING MACHINE.
APPLICATION FILED MAR. 13, 1911.
1,019,323.
Patented Mar. 5, 1912.
2 SHEETS—SHEET 2.
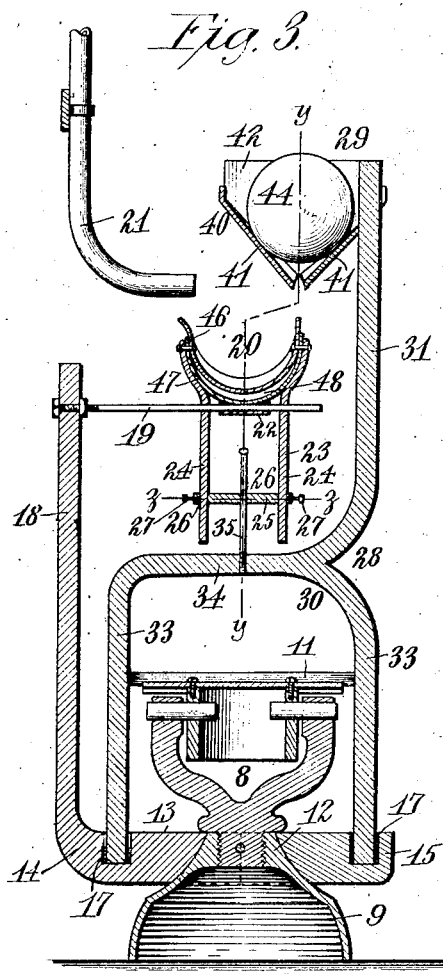
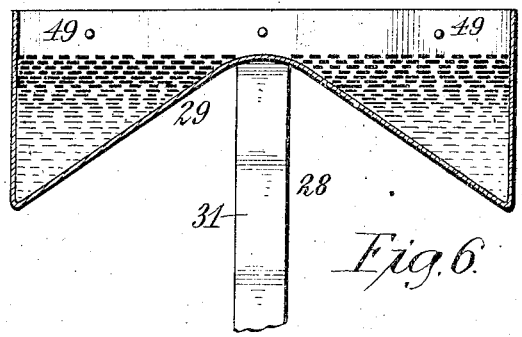
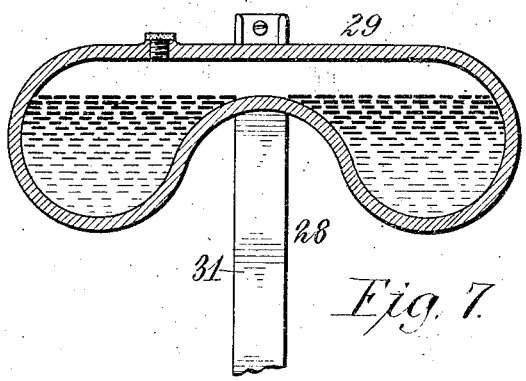
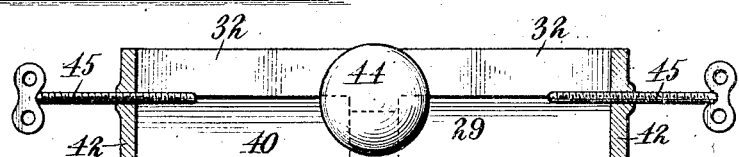
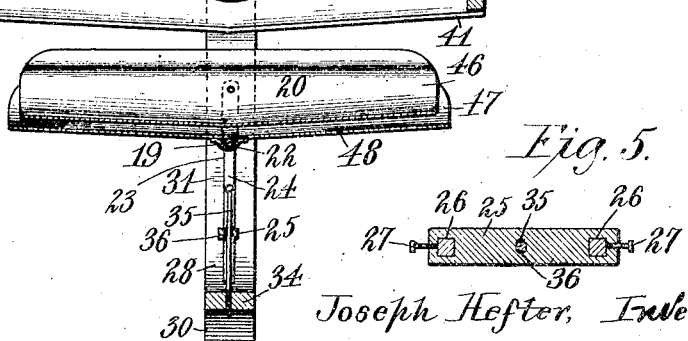
Witnesses:
Jacob Oberst, Jr.
Ella E. Rueckhahn
Joseph Hefter, Inventor.
By Emil Kienhart
Attorney.

UNITED STATES PATENT OFFICE.

JOSEPH HEFTER, OF BUFFALO, NEW YORK.

AUTOMATIC WEIGHING-MACHINE.

1,019,323.  Specification of Letters Patent.  Patented Mar. 5, 1912.

Application filed March 13, 1911. Serial No. 614,083.

*To all whom it may concern:*

Be it known that I, JOSEPH HEFTER, a citizen of the United States, and resident of Buffalo, in the county of Erie and State of New York, have invented new and useful improvements in Automatic Weighing-Machines, of which the following is a specification.

My invention relates to an automatic weighing machine and more particularly to a machine of this character in which provision is made for filling a receptacle by weight.

The embodiment of my invention herein disclosed is designed for filling cans with paint or other fluid matter and by slight modifications and rearrangement or adjustment to cause some of the parts to have a greater range of movement, pulverulent substances may be as readily weighed as fluid matter; also grain or similar material.

The primary object of my invention is to provide an automatic weighing machine in which controlling and feeding parts can be applied to an ordinary balance platform or other scale.

Another object of my invention is the provision of a feed trough so constructed that paint or other fluids will not drip onto the receptacle-support or platform after the receptacle is removed.

Other objects are to provide a controlling balance adjustable to cause the balancing element thereof to move sooner or later, depending on the weight of the material to be deposited in the receptacle and to provide a balance run-way inclined from opposite ends toward the center and widened toward the center so that the spherical or other balance traveling therein will increase its velocity toward the center of the runway in traveling from one end thereof to the other so as to more readily and easily counteract the weight of the filled receptacle on the scale and render the machine quicker in action.

Further objects are to provide means for adjusting the movement of the feed trough; to so construct the feed trough that the flow of the paint or other fluid over the delivering end of the same is more quickly checked, and to otherwise improve on automatic weighing machines.

With these and other objects in view, the invention consists in the arrangement and coöperation of devices, in the construction of parts and in the arrangement and combination of elements to be hereinafter described and particularly pointed out in the subjoined claims.

Figure 2:
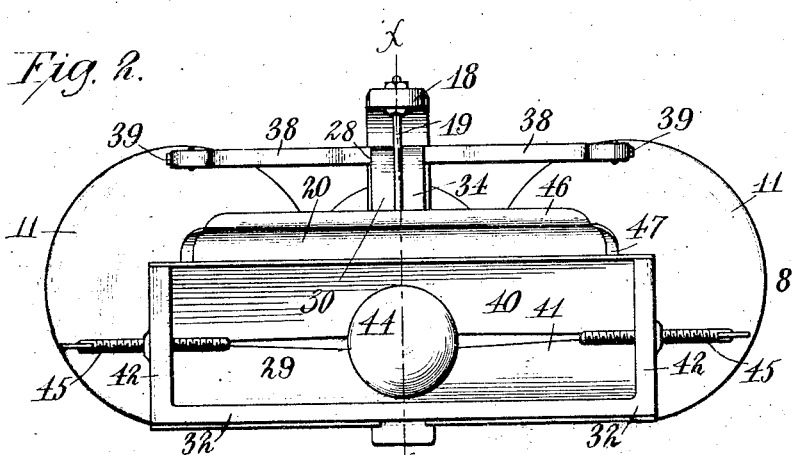

Figure 1 is a front elevation of an automatic weighing machine embodying my invention in a representative manner. Fig. 2 is a plan view of the same. Fig. 3 is a central vertical section taken on line $x$—$x$, Fig. 2. Fig. 4 is a vertical section taken on the planes indicated by line $y$—$y$, Fig. 3. Fig 5 is an enlarged section taken on line $z$—$z$, Fig. 3. Figs. 6 and 7 are end sectional views of modified forms of balance controls.

Referring now to the drawings in detail, corresponding numerals refer to corresponding parts in the several figures.

The reference numeral 8 designates an ordinary balance scale, such as has a base 9, a balancing beam 10, and platforms or tables 11 at opposite ends of said beam. Any other form of scale, however, may be substituted for that herein shown and referred to in general terms. Around the central portion 12 of said base is removably secured a supporting frame 13, which in this instance comprises two parts 14, 15 placed on opposite sides of said central portion and clamped thereto by means of screws 16. Each of the parts forming this supporting frame has a V-shaped upwardly-opening depression 17 and the part 14 has an upstanding arm 18 to which is secured a pivot pin 19 extending therefrom.

The paint or other fluid matter is delivered into a trough 20 by means of a pipe 21, said trough being arranged transversely above the scale proper and having its ends terminating about centrally over the platforms or tables 11 and it is pivotally mounted on the pivot pin 19 which passes through a loop or extension 22 on the underside of the trough. A rocker frame 23 is secured to said trough and comprises two depending arms 24 connected at their upper ends to opposite sides of the trough and having their lower ends connected together by a cross bar 25 which is adjustable on said arms. To permit of adjusting this cross bar, it preferably has a square opening 26 at each end and the arms 24 are correspondingly shaped, as best shown in Fig. 5; and after adjusting said bar vertically on said arms, it is secured in position by means of set screws 27 passing through the ends of said bar and impinging against said arms. If desired, the depending arms may be otherwise formed in cross section and the openings in the cross bar 25 formed to properly receive the same.

28 designates a tilting or controlling frame which supports the balance device 29 and also serves to tilt the feed trough 20, as will presently appear. This tilting frame may be of any suitable construction for the purpose intended; but that which I now deem desirable has at its lower end an inverted substantially U-shaped part 30 and an arm 31 extending upward from said U-shaped part and having oppositely extending arms 32 at its upper end. The frame in the form herein shown has therefore a T-shaped upper portion and an inverted U-shaped lower portion by means of which said T-shaped portion is supported. The U-shaped portion consequently has two vertical members 33 connected at their upper ends by a horizontal portion 34, to which latter is secured a shifter pin 35 which passes through an opening 36 in the cross bar 25 of the rocker frame and preferably extends a distance above the lower ends of the depending arms 24 connected by said cross bar. The lower ends of the vertical members 33 at the lower end of the tilting frame are tapered, as at 37, and enter the V-shaped notches 17 in the supporting frame. The inclination of the V-shaped walls of said notches is greater than the inclination of the tapered edges so that the necessary clearance is provided between said edges and V-shaped walls to permit the tilting frame to rock freely, and in order that movement be imparted to said tilting frame by the platforms or tables 11 of the scale proper, arms 38 extend laterally from said frame in opposite directions and have at their extremities rollers 39 which bear against the upper surfaces of said platforms or tables.

Secured to the upper end of the tilting frame is a runway 40 which is substantially V-shape in cross section and preferably constructed of two inclined side members 41 and end members 42 to which the ends of the side members are secured. Said side members are gradually separated from each other toward their centers, as best shown in Fig. 2, which tends to widen the runway at its lower portion and also tends to incline the runway from opposite ends to its center.

I consider this a very desirable feature of my invention, but do not consider it necessary to obtain these advantages by the use of specific means described and shown, as a runway inclined from its ends toward its center, or a runway gradually widened toward its longitudinal center, or both inclined and widened, may be made in various other ways. One of the side members 41 of the runway herein shown and described, may also be secured to the laterally extending arms 32 of the frame, as at 43.

Arranged for rolling movement in the runway 40, is a spherical weight 44 preferably of metal and adapted to roll from one end thereof toward the other. The range of movement of this weight or balance as it may well be termed, is governed by stop screws 45 passing through the end members and extending into the trough the distance desired to regulate the movement of the balance.

The feed trough 20 is preferably constructed of two parts 46, 47, which are both made U-shape, or substantially so, in cross section and arranged to fit one into the other so that a crescent shaped space 48 intervenes. The part 47 may be called the outer part and this part is a trifle longer than the inner part 46 and arranged with respect to said inner part that it extends beyond opposite ends of the same.

While I have described the supporting frame 13 as constructed separate from the scale proper, it is apparent that this support may be cast integrally with the base 9 of the scale and that the supporting frame and tilting frame may be fashioned in various ways and supported in any manner admitting of producing the desired results.

When the parts are in normal position the scale is balanced to bring the platforms or tables 11 thereof into the same plane and the tilting or controlling frame is held central with the balance thereof centrally positioned in the runway; the feed trough being also in horizontal position. When starting to operate the device by means of the process of filling the cans or other receptacles, the can or receptacle is placed upon one of the platforms or tables 11, say for instance, the platform at the right in Fig. 1, and the other platform may be depressed by hand or otherwise. This swings the tilting frame to the left, as shown in Fig. 1, which results in the balance ball 44 rolling to the left against the left hand stop screw 45, and it also tilts the feed trough so that it will incline to the right. Now upon supplying the paint or other substance through the pipe 21 or some other supply, the material or substance is delivered into the feed trough 20 and from there into a receptacle or can placed on the elevated table or platform. During the filling of this can the operator may place an empty can upon the depressed table or platform 11 and as soon as the can on the elevated table or platform is filled to the necessary extent, which is governed by the weight necessary to counteract the weight of the balance element 44, the tilting frame is moved from the position shown in full lines in Fig. 1, to that shown in dotted lines, which causes the balance to roll to the right hand end of the runway and the feed trough to swing to the left, as shown in dotted lines in said figure, and also causes the platform with the empty receptacle or can to be elevated and the table or platform with the filled can to be depressed. Said filled can may then be removed and an empty can substituted therefor. During the removal of the filled can from the now depressed platform and the placing of the empty can thereon, the can on the now elevated platform is being filled and when it has the desired quantity fed into it, the weight of the balance element at the right hand end of the runway will be counteracted and cause a reversal of the parts, this being continued so that while the can on one table or platform is being filled, the filled can on the other is taken away and an empty can substituted therefor, thus making a continuous operation and assuring the filling of all cans exactly alike, which is controlled by exact weight. The tilting of the frame 28 causes the shifter pin 35 to swing the feed trough on its pivot pin 19 and the extent to which this trough is to be swung can be regulated by raising or lowering the cross bar 25 on the depending arms 24 of the rocker frame so as to bring it closer to or farther from the center on which said shifter pin is swung.

By making the feed trough in two parts with a space between them and with one part longer than the other, the paint or substance flowing over the ends of the trough will not drip onto the platform, but instead drips onto the longer part of the trough and enters the space between the two parts until the accumulation of dripping is sufficient to flow, when it will drip from the depressed end of the longer part; and in order to prevent the paint running over either end of the trough when elevating it, the trough is preferably inclined toward its center so that the paint tends to flow toward the opposite end or to the center before the trough assumes a horizontal position. This checks the flow of the paint over the depressed end quicker than would otherwise be done and therefore the amount of paint dripping over the edge while elevating the trough is reduced to the minimum.

In the modification shown in Fig. 6, a water receptacle is shown mounted on the upper end of the tilting or controlling frame, it being open at the top and having its bottom inclined from the longitudinal center toward the ends, thus forming two water chambers or spaces 49 in which water is held and when the frame is tilted to the left, a greater quantity of water will be held in the left hand end of the receptacle than at the right; and when in this position, the can on the table or platform at the right is being filled, and when filled, the weight of the water in the left end portion of the water receptacle is counterbalanced, which causes the tilting frame to swing to the right and a portion of the water at the left hand end of the receptacle to flow into the right hand end, and it also causes the table or platform at the left to be elevated.

In Fig. 7 a mercury receptacle is shown applied to the upper end of the tilting frame, and in order that the mercury in said receptacle responds quickly to the change of positions of said frame, the receptacle is made of cast iron. The operation and action, however, are similar to the balance device shown in Fig. 6.

Having thus described my invention, what I claim is—

1. A weighing scale comprising balanced tables, a support, a tilting frame carried by said support and arranged to be actuated by said tables alternately, a balancing device at the upper end of said frame, a trough located above said balanced tables and pivotally mounted at a point between its ends on said support, and means of connection between said tilting frame and said trough for inclining the latter in opposite directions.

2. In combination with a scale having a pair of tables or platforms, a supporting frame carried by said scale, a tilting frame carried by said supporting frame and having means engaging said tables to cause said tilting frame to tilt, a balance device at the upper end of said tilting frame having movable balancing means, a trough pivotally held between its ends above said scale with its ends above said balanced tables, and connection between said tilting frame and said trough for causing the latter to incline in opposite directions.

3. The combination with a platform scale, having a pair of movable tables, of a tilting frame having a movable balancing element and being operated by said tables assisted by said balancing element, a feed trough pivotally mounted between its ends to be inclined in opposite directions, and connection between said tilting frame and said feed trough for controlling the movement of the latter.

4. In a weighing machine, the combination of a support, a pair of tables movable under weight, a tilting frame carried by said support and actuated by the movements of said tables, a feed trough pivotally secured to said support at a point between its ends, and adjustable connection between said tilting frame and said feed trough to govern the degree to which the latter is to be inclined.

5. In a weighing machine, the combination of a support, a pair of tables movable under weight, a tilting frame carried by said support and actuated by the movements of said tables, a feed trough mounted on said support and operated by said tilting frame to incline in opposite directions, a rocker frame secured to said trough and comprising a pair of depending arms and a cross bar connecting said arms, and a shifter pin secured to said tilting frame and engaging said cross bar.

6. In a weighing machine, the combination of a support, a pair of tables movable under weight, a tilting frame carried by said support in a plane between said tables and having oppositely extending arms engaging said tables, a feed trough pivotally mounted at a point between its ends on said support in a plane above said tables, and connection between said tilting frame and said feed trough to cause the latter to be inclined alternately in opposite directions.

7. In a weighing machine, the combination of a support, a pair of tables movable under weight, a tilting frame arranged in a plane between said tables and having oppositely extending arms provided with rollers at their extremities in contact with said tables, a feed trough pivotally secured between its ends to said support, and connection between said tilting frame and said feed trough to cause the latter to tilt in a direction opposite that in which the tilting frame is tilted.

8. In a weighing machine, the combination with a support having V-shaped depressions, a pair of tables carried by said support and movable under weight, a tilting frame having tapered bearing points fitting into said V-shaped depressions and arranged to be operated by the movements of said tables, and a feed trough operated by said tilting frame to alternately feed into receptacles placed upon said tables.

9. In a weighing machine, the combination of a pair of tables movable under weight, a tilting frame actuated by said tables to tilt alternately in opposite directions and having a balance device at its upper end embodying an element possessing weight adapted to move to assist in tilting said frame, and a feed trough pivotally mounted between its ends and actuated by said tilting frame, said trough being arranged to feed into receptacles placed upon said tables.

10. In a weighing machine, the combination with a scale having balanced tables, a supporting frame secured to the body of said scale and having an upstanding arm, a tilting frame carried by said supporting frame and having lateral arms in contact with said tables and a balance device at its upper end assisting in tilting said tilting frame, a pivot pin projecting from the upstanding arm of said supporting frame, a feed trough mounted on said pivot pin, and connection between said tilting frame and said feed trough to cause the latter to be inclined in opposite directions for alternately feeding into receptacles placed upon said tables.

11. In a weighing machine, the combination with a scale having a pair of platforms movable under weight, a tilting frame having a transversely-disposed runway at its upper end, a weight in said run-way, and a feed trough arranged above said scale and beneath said runway and having connection with said tilting frame so as to be inclined in opposite directions.

12. The combination with a scale, of a tilting frame having a runway at its upper end inclined from both ends toward the center, a spherical weight movable in said runway, a feed trough arranged between said runway and said scale and pivotally secured between its ends, and connection between said tilting frame and said feed trough to cause the latter to be inclined in opposite directions.

13. The combination with a scale, of a tilting frame having a substantially V-shaped runway at its upper end gradually widened at least at its lower portion from both ends toward its center, a spherical weight movable in said runway, a feed trough between said runway and said scale, and means of connection between said tilting frame and said feed trough to cause the latter to incline in opposite directions.

14. A balancing device for automatic weighing machines, comprising a V-shaped runway inclined and from opposite ends toward its center, and a spherical weight movable in said runway.

15. In an automatic weighing machine for fluid matter, a feed trough adapted to be inclined in opposite directions and having two walls separated by an intervening space, one wall being arranged above the other and the upper wall being shorter than the lower.

16. In an automatic weighing machine for fluid matter, a feed trough adapted to be inclined in opposite directions and comprising two substantially U-shaped parts fitting one within the other with an intervening crescent shaped space, the outer U-shaped part being longer than the inner part and extending beyond opposite ends of the latter.

17. The combination with a scale, of a tilting frame having a runway provided with opposite inclines forming high and low points, a weight movable in said runway, a feed trough between said runway and said scale, and means of connection between said tilting frame and said feed trough to cause the latter to incline in opposite directions.

In testimony whereof, I have affixed my signature in the presence of two subscribing witnesses.

JOSEPH HEFTER.

Witnesses:
ELLA C. PLUECKHAHN,
EMIL NEUHART.